United States Patent Office 3,507,924
Patented Apr. 21, 1970

3,507,924
METHOD OF PRODUCING AROMATIC NITRO COMPOUNDS
Christer Lennart Hakansson, Karlskoga, and John Martin Nilsson, Solna, Sweden, assignors to Aktiebolaget Bofors, Bofors, Sweden
No Drawing. Filed June 11, 1968, Ser. No. 735,967
Claims priority, application Sweden, June 15, 1967, 8,433/67
Int. Cl. C07c 79/10
U.S. Cl. 260—645          5 Claims

ABSTRACT OF THE DISCLOSURE

Nitro-substituted aromatic compouds of the formula:

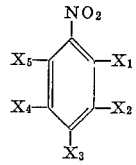

wherein $X_1$ to $X_5$ are hydrogen or nitro are obtained by heating the corresponding carboxylic acid:

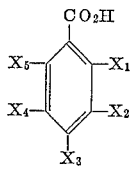

with nitric acid under pressure. Instead of the carboxylic a corresponding aromatic compound containing a group which may be oxidized to a carboxyl, such as a methyl, may also be used.

---

The present invention relates to a method of producing aromatic nitro compounds and particularly nitro-substituted compounds of the type:

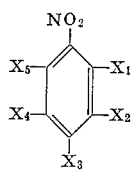

in which the substituents $X_1$–$X_5$ consist of either hydrogen or nitro groups. The method is particularly well suited for use in the preparation of aromatic nitro compounds which cannot be produced to advantage through direct nitration processes, and as examples of such compounds for which the present production method is of particular interest can be mentioned o-dinitrobenzene and p-dinitrobenzene.

In general, the production of aromatic nitro compounds takes place through direct nitration processes, which involves that one or several hydrogen atoms in the aromatic ring are substituted by nitro groups. Through the use of such direct nitration processes, a plurality of important nitro compounds can be produced, such as nitrobenzene, o- or p-isomers of mononitrotoluene, 2,4,6-trinitrotoluene, o- and p-nitrochlorobenzenes and m-dinitrobenzene. However, certain aromatic nitro compounds cannot be produced successfully through direct nitration, and this applies to e.g. o-dinitrobenzene and p-dinitrobenzene, which cannot be obtained through direct nitration of nitrobenzene. In the last-mentioned case it has herefore been necessary to resort to indirect ways, in which the nitro group in the desired position is obtained in some way other than through direct nitration. Use has often been made of the conversion of an amino group into a nitro group through oxidation with appropriate oxidation means, or by diazotization and bonding of the diazotizing salt obtained with nitrite ion in the presence of copper. However, these last-mentioned methods are comparatively complicated to carry out, and are considerably more expensive than if direct nitration could be used. There is, therefore, a great interest in finding other methods for the production of nitro compounds, particularly those nitro compounds which are not accessible through direct nitration, such as o-dinitrobenzene and p-dinitrobenzene.

The present invention relates to the production of aromatic nitro compounds through the substitution of a carboxyl group with a nitro group. Such substitution reactions of carboxyl groups with other groups are known only in certain special cases. With aromatic carboxylic acid the best known examples are a decarboxylation reaction in which the carboxyl group is replaced by hydrogen, and the so-called Hunsdiecker's reaction, in which the carboxyl group is replaced with halogen, usually by heating the dry silver salt of the carboxylic acid with halogen. Both of these last-mentioned reactions have to a certain extent preparative value, and can be applied to some common types of substituted benzoic acids. On the other hand, reactions where an aromatically bonded carboxyl group is replaced by a nitro group has previously been known only for certan very special types of substituted benzoic acids, and hitherto they do not seem to have any preparative value whatsoever. The known examples where an aromatically bonded carboxyl group is replaced by a nitro group are thus limited to the cases where a hydroxyl group or methoxyl group in o- or p-position in relation to the carboxyl group is present. R. A. Henry ("Nitrosodecarboxylation," J. Org. Chem. 23, 648–50, (1958)) has thus described a reaction between o- and p-hydroxybenzoic acids with sodium nitrate in a water solution, where it could be shown that a carboxyl group had been replaced by a nitro group. Hübner et al. (Berichte 12, 1346, (1879)) found that during the nitration of 3-nitro-salicylic acid with ice-cold fuming nitric acid, 2,6-dinitro-phenol was formed as a by-product, and Schiffer, (Berichte 25, 721–32 (1892)) obtained 3,4,5-trimethoxynitrobenzene by the nitration of 3,4,5-trimethoxybenzoic acid in acetic acid. In the last-mentioned reactions, the process, to a major extent, must be a decarboxylation followed by a nitration in o- or p-position in relation to the hydroxyl or methoxyl group, which groups act in such a way that both the carboxylation and the nitration in o- or p-position are greatly facilitated. To a certain extent, however, the described reactions seem to have been carried out through direct replacement of the carboxylic group with a nitro group, as the isomers corresponding to such a reaction seem to have been formed in a comparatively large quantity. The above-mentioned examples of reactions in which the carboxyl groups had been replaced by nitro groups do not seen to have been given any preparative use.

For aromatic carboxylic acids which do not contain hydroxyl or alkoxyl substituents, no reactions have previously been described in which the carboxyl group is replaced by a nitro group. A common method of producing aromatic carboxylic acids of this kind is the oxidation of the corresponding alkyl-substituted aromatic compounds, and in many cases, particularly when it is a question of nitro or halogen-substituted benzoic acids, the production has then taken place through the oxidation with nitric acid under pressure at a temperature of 150°–250°. At these processes the yield of the aromatic carboxylic acids desired is high, and there is therefore reason to assume that the carboxylic acids in question would be stable against the further influence of the nitric acid under the conditions prevailing at the reaction. It must, therefore, be considered highly surprising that a replacement of the carboxylic group with a nitro group can be carried out by heating an aromatic carboxylic acid with nitric acid under pressure, in which process the aromatic carboxylic acid can be benzoic acid or a nitro-substituted benzoic acid.

As a prime material for the substituted benzoic acids in question, alkyl-substituted compounds can often be used, and these can then first be oxidized by means of nitric acid to a carboxylic acid, which thereafter, also under the influence of nitric acid, gives the aromatic nitro compound desired. The fact that an alkyl-substituted aromatic compound can be used as prime material for the aromatic nitro compounds desired is extremely interesting from an economic point of view, as in this way, in one single process, using the present invention, an alkyl group or other oxidable side chain can be transferred direct to a nitro group.

When producing nitro compounds according to the present invention, it is advantageous to use reaction temperatures which are somewhat higher than the one that has proved appropriate for the oxidation of the corresponding alkyl-substituted compound to an aromatic carboxylic acid. Moreover, in the production of aromatic nitro compounds, the molar ratio of nitric acid to the alkyl-substituted aromatic compound should, of course, be greater than in the oxidation to a carboxylic acid, as nitric acid is consumed at the introduction of nitro groups. With the method according to the present invention, the concentration of the nitric acid can be varied within wide limits. However, it seems that too low a concentration is not an advantage with consideration to the reaction speed.

As previously mentioned, the method according to the present invention is well suited for the production of aromatic nitro compounds which are not accessible through direct nitration processes. Thus, for instance, through the method according to the present invention, o-dinitro-benzene can easily be obtained, from o-nitrobenzoic acid or from the easily available o-nitrotoluene, the o-dinitrobenzene can be used as an intermediate for e.g. dyestuffs, which it has previously not been possible to produce other than through expensive multi-stage procedures. The same applies to p-dinitrobenzene, which through the method according to the present invention can be produced from p-dinitrobenzoic acid or from p-nitrotoluene.

As a further example can be mentioned that through the present method it is possible to obtain nitrobenzene, and m-dinitrobenzene via benzoic acid and m-nitrobenzoic acid, respectively. However, it is more economical to obtain these substances through direct nitration of benzene. For the rest, the method according to the present invention is of general interest for the production of aromatic nitro compounds which are difficult to obtain from the corresponding aromatic carboxylic acids or corresponding alkyl-substituted aromatic compounds.

The invention will now be described in more detail with reference to the following examples.

EXAMPLE 1

0.17 g. of o-nitrobenzoic acid (1 mmol) and 0.38 g. of 50% nitric acid (3 mmol) were heated in an ampoule to 220° C. for 30 min. The formation of reddish-brown gases could be noticed at approx. 155° C., and the formation of gas thereafter increased heavily. After the reaction, the reaction mixture was neutralized with sodium bicarbonate, and the product obtained was extracted by means of methylene chloride. The methylene chloride extract was analyzed through gas chromatography and proved to contain 14 mg. of o-dinitrobenzene. No nitrobenzene could be found.

EXAMPLE 2

0.125 g. of p-nitrobenzoic acid (0.75 mmol) and 0.28 g. of 50% nitric acid (2.25 mmol) were heated in an ampoule to 240° C. for 1 hour. The formation of reddish-brown gases could be noticed at 150° C., and thereafter increased heavily. The reaction mixture was processed in the same way as per Example 1, and proved to contain 5 mg. of p-dinitrobenzene.

EXAMPLE 3

0.125 g. of m-nitrobenzoic acid (0.75 mmol) and 0.28 g. of 50% nitric acid (2.25 mmol) were heated in an ampoule to 240° C. for 1 hour. The formation of reddish-brown gases could be noticed at 185° C., and thereafter increased heavily. The reaction mixture was processed in the same way as per Example 1, and proved to contain 16.6 mg. of m-dinitrobenzene.

EXAMPLE 4

0.093 g. of benzoic acid (0.75 mmol) and 0.28 g. of 50% nitric acid (2.25 mmol) were heated in an ampoule to 235° C. for 50 min. The formation of reddish-brown gases could be noticed at 180° C. and during the remainder of the reaction. The reaction mixture was processed in the same way as per Example 1, and proved to contain 10.7 mg. of nitrobenzene. No benzene could be found.

EXAMPLE 5

20 g. of o-nitrobenzoic acid and 80 g. of 20% nitric acid were charged into a 300 ml. digestor, provided with a magnetic stirrer. The temperature was increased to 220° C., and kept at this level for 1 hour. The pressure in the digestor then amounted to 20 kp./cm.$^2$. After cooling, the reaction mixture was made alkaline with a sodium hydroxide solution and then extracted with methylene chloride (3× 25 ml.). After evaporation of the solvent, 0.7 g. of o-dinitrobenzene was obtained. On acidification, 14.9 g. of unreacted o-nitrobenzoic acid was precipitated from the water phase.

EXAMPLE 6

The procedure as in Example 5 was repeated, but with the difference, however, that the reaction temperature was 250° C., and the pressure then amounted to 40–50 kp./cm.$^2$. In the same way as in Example 5, 2.7 g. of o-dinitrobenzene and 6.9 g. of unreacted o-nitrobenzoic acid was obtained from the reaction mixture.

EXAMPLE 7

The test in this example was carried out in the same way as in Example 5, but with the differences that 30.2 g. of 50% nitric acid with a concentration of 50% was used and the reaction temperature was 250° C. The reaction mixture was processed as described in Example 5, and the yield was 4.6 g. of o-dinitrobenzene and 5.2 g. of unreacted o-nitrobenzoic acid.

EXAMPLE 8

12.5 g. of o-nitrotoluene (0.091 mol) and 100 g. of 50% nitric acid (0.79 mol) were charged into a 300 ml.

digestor provided with a magnetic stirrer. The temperature was raised to 215° C., and kept at this level for 5 min. Thereafter, the temperature was raised for 10 min. to 250° C., and kept at this level for 1 hour. The pressure in the digestor was kept at 40–50 kp./cm.² by venting the gases formed. After cooling, the reaction mixture was made alkaline by means of a sodium hydroxide solution, and extracted with methylene chloride (3× 25 ml.). Through evaporation of the extract, 4.0 g. of o-dinitrobenzene was obtained. Upon acidification, 1.7 g. of o-nitrobenzoic acid was obtained from the water phase.

What is claimed is:

1. A method of preparing nitro-substituted compounds of the formula:

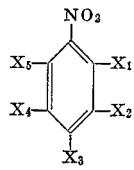

wherein $X_1$ to $X_5$ are hydrogen or nitro groups, which comprises heating in nitric acid at a temperature from about 215° C. to 250° C. and a pressure of about 20 to 50 kp./cm.² a compound of

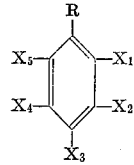

wherein $X_1$ to $X_5$ are the same as above and R is carboxyl or methyl.

2. A method according to claim 1 wherein R is methyl.

3. A method according to claim 1 wherein R is carboxyl.

4. A method according to claim 1 wherein $X_1$ is nitro and $X_2$ to $X_5$ are hydrogen.

5. A method according to claim 1 wherein $X_3$ is nitro and $X_1$, $X_2$, $X_4$, and $X_5$ are hydrogen.

References Cited

Nightingale, Chem. Reviews, vol. 40, pp. 134 to 140 (1947).

LELAND A. SEBASTIAN, Primary Examiner